United States Patent [19]
Torizuka et al.

[11] Patent Number: 5,602,327
[45] Date of Patent: Feb. 11, 1997

[54] LEAKAGE-SOUND DETECTING APPARATUS

[75] Inventors: Yukio Torizuka, Niiza; Hiroshi Uno, Saitama; Kouji Kitazume, Tokyo, all of Japan

[73] Assignee: Fuji Tecom, Inc., Tokyo, Japan

[21] Appl. No.: 524,085

[22] Filed: Sep. 6, 1995

[30] Foreign Application Priority Data

Feb. 12, 1993 [GB] United Kingdom ............... 9324799
Mar. 25, 1993 [JP] Japan ............................. 5-090630
Mar. 29, 1993 [JP] Japan ............................. 5-121863

[51] Int. Cl.⁶ .............................. G01M 3/24; H04R 17/00
[52] U.S. Cl. .......................... 73/40.5 A; 73/592; 73/644
[58] Field of Search .......................... 73/40.5 A, 592, 73/649, 642, 644; 367/180, 188; 181/207, 208, 198; 310/321, 323, 328

[56] References Cited

U.S. PATENT DOCUMENTS

| | | | |
|---|---|---|---|
| 3,387,604 | 6/1968 | Erikson | 73/642 X |
| 3,663,842 | 5/1972 | Miller | 73/642 X |
| 4,205,686 | 6/1980 | Harris et al. | 73/644 X |

FOREIGN PATENT DOCUMENTS

| | | | |
|---|---|---|---|
| 403122530 | 5/1991 | Japan | 73/649 |
| 403272455 | 12/1991 | Japan | 73/649 |

*Primary Examiner*—Michael Brock
*Attorney, Agent, or Firm*—Kolisch, Hartwell, Dickinson, McCormack & Heuser

[57] ABSTRACT

A leakage-sound detecting apparatus is provided for efficiently detecting water leakage in a plastic pipe by increasing sensitivity to a low frequency sound component and efficiently reducing stray noise, as well as protecting a piezoelectric element. To this end a detection portion and a pedestal portion are connected through a mechanical resonant member formed of a soft material. A low frequency sound component is amplified by the resonant member, and high frequency components are substantially attenuated. In an alternative arrangement a detection portion and a mechanical resonant member mounted on a pedestal portion are connected through a buffer portion having a buffer member arranged therein. When a shock is applied to the bottom of the pedestal portion, due to the apparatus being dropped for example, the buffer member is compressed, and no overload is applied to a piezoelectric element.

6 Claims, 9 Drawing Sheets

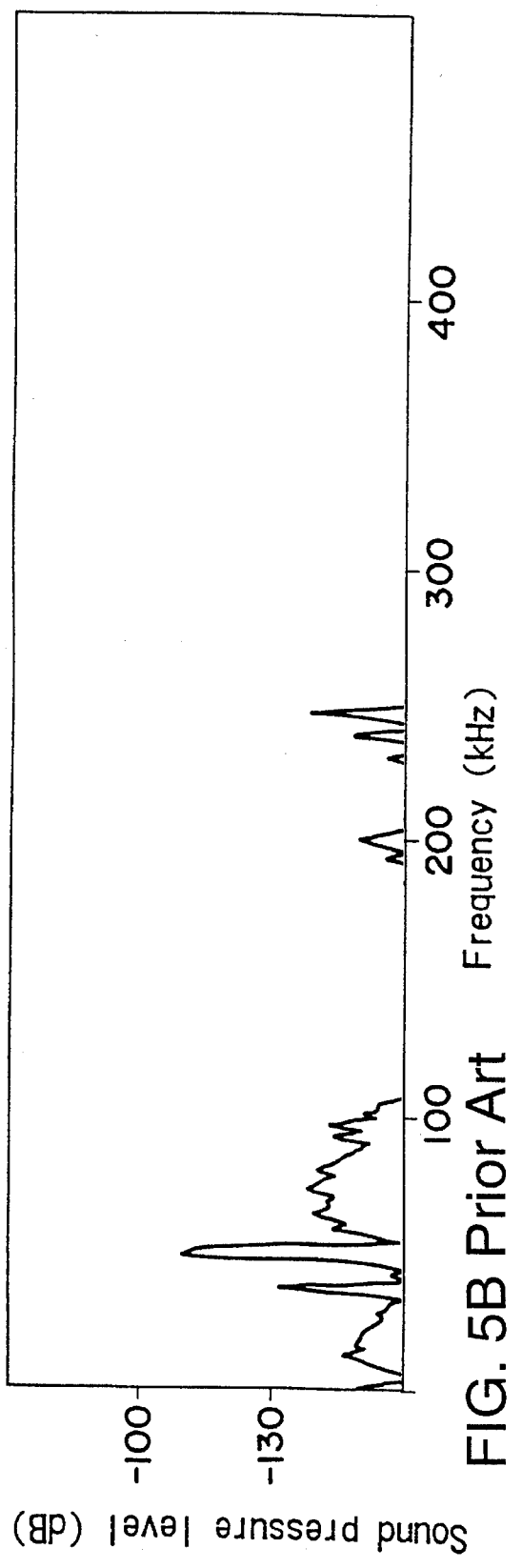
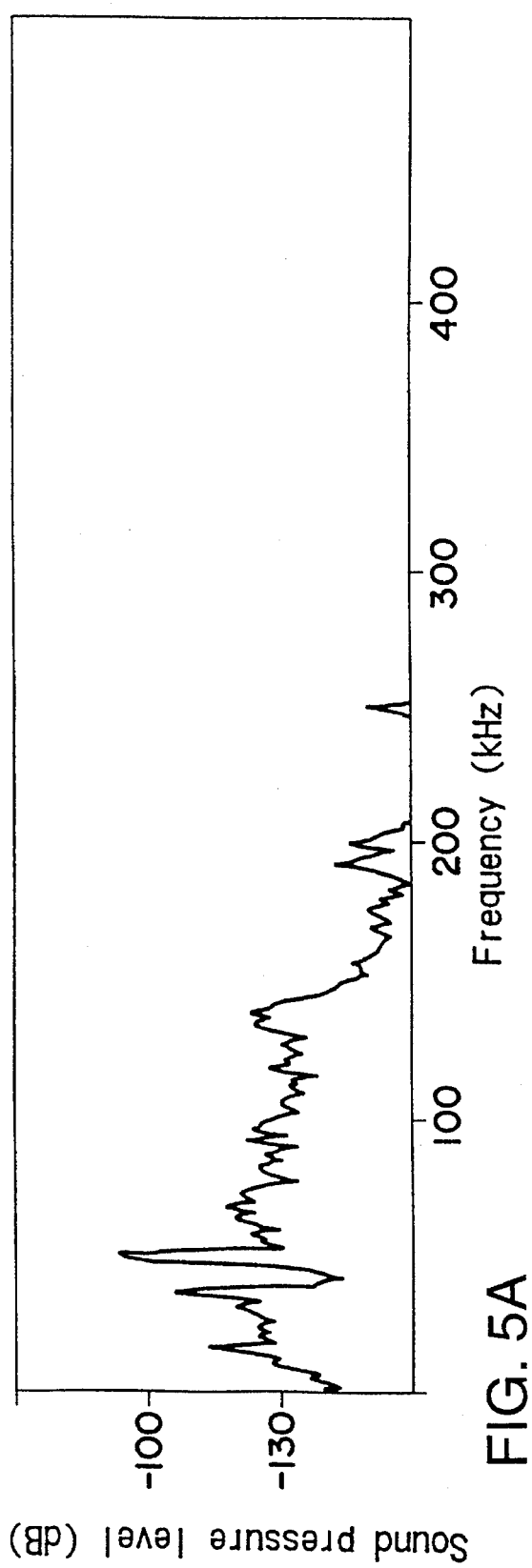

5,602,327

LEAKAGE-SOUND DETECTING APPARATUS

BACKGROUND OF THE INVENTION

1. Field of the Invention

The present invention relates to a leakage-sound detecting apparatus used to detect a water leakage place or spot in a water service pipeline.

2. Description of the Prior Art

As a method for detecting a water leakage spot in a water service pipeline, there has been generally practiced a method in which a single leakage-sound detecting apparatus is placed on the ground surface where the water service pipeline is embedded or two leakage-sound detecting apparatuses are secured to a fire hydrant or the like installed at a desired position of the water service pipeline so that a propagation sound of the water leakage-sound is detected by these leakage-sound detecting apparatuses to analyze correlative waveforms outputted, thereby detecting the water leakage spot.

In the leakage-sound detecting apparatuses heretofore used, a piezoelectric element is encased in a metal casing. This has its object to detect sounds of a wide range of frequency components. Therefore, there is a flat sensitivity characteristic up to a high frequency component such as several kHz, in general.

With the recent intense trend of replacement of water service pipes, that is, replacement of conventional metal pipes with plastic pipes such as vinyl chloride, polyethylene chloride and the like in accordance with one way of preparation of the pipeline service by the water service undertaking body, higher efficiency of water-leakage detection in connection with plastic pipes has also been eagerly demanded.

However, the water leakage sound propagating along the plastic pipes, e.g. the sound of high frequency component in excess of 500 Hz becomes greatly attenuated as compared to metal pipes, and only the sound of frequency component from scores of Hz to hundreds of Hz results.

Further, the conventional leakage-sound detecting apparatuses have a wide band of sensitivity characteristic, and therefore detect even foreign noises other than the water leakage sound to be detected.

For this reason, the conventional leakage-sound detecting apparatuses are hard to efficiently detect the water-leakage propagation sound whilst are apt to detect the foreign noises, thus making it extremely difficult to perform higher efficiency of detection of water leakage in connection with the plastic pipes.

SUMMARY OF THE INVENTION

An object of the present invention is to provide a leakages-sound detecting apparatus which can increase a sensitivity of a low frequency component and efficiently reduce the detection of foreign noises to efficiently perform the detection of water leakage in the plastic pipes.

For achieving the aforementioned object, the present invention provides a leakage-sound detecting apparatus in which a detection portion having a piezoelectric element encased in a casing and a pedestal portion made of a rigid material are connected through a mechanical resonant member made of a soft material.

Further, a lower extending portion incised with internal threads is provided on the lower wall portion of the detection portion, a buffer-member supporting portion bored with an insert hole is provided on the upper surface portion of the mechanical resonant member, the lower end of the lower extending portion is located at the insert hole, the lower extending portion and the buffer-member supporting portion are connected by a stop screw, and a buffer member is arranged between the lower wall portion of the casing and the buffer-member supporting portion to form a buffer portion.

The leakage-sound detecting apparatus amplifies low frequency components in the vicinity of a set value in the mechanical resonant member and substantially attenuates high frequency components other than the low frequency components.

In the case where an overload is applied as a result of falling of the leakage-sound detecting apparatus or the like, the lower extending portion is not moved upward together with the buffer-member supporting portion but only the buffer-member supporting portion is first moved upward to compress the buffer member. Thereby, the shock force is minimized by the buffer member so that the over-load is not applied to the detection portion. As a result, the piezoelectric element is not curved or broken.

On the other hand, since in the normal detection, the water leakage propagation sound is transmitted to the lower extending portion and the detection portion through the pedestal portion, the mechanical resonant member, the buffer-member supporting portion and the stop screw, the amplification and attenuation actions are not lowered.

BRIEF DESCRIPTION OF THE DRAWINGS

FIGS. 5(A) and 5(B) are spectrum diagrams of water leakage propagation sounds at a point 10 m away from the water leakage point, FIG. 5(A) showing the detection by the leakage-sound detecting apparatus according to the present invention, FIG. 5(B) showing the detection by the conventional leakage-sound detecting apparatus.

DETAILED DESCRIPTION OF THE INVENTION

One embodiment of the leakage-sound detecting apparatus according to the present invention will be described hereinbelow with reference to the drawings.

Figure 1:
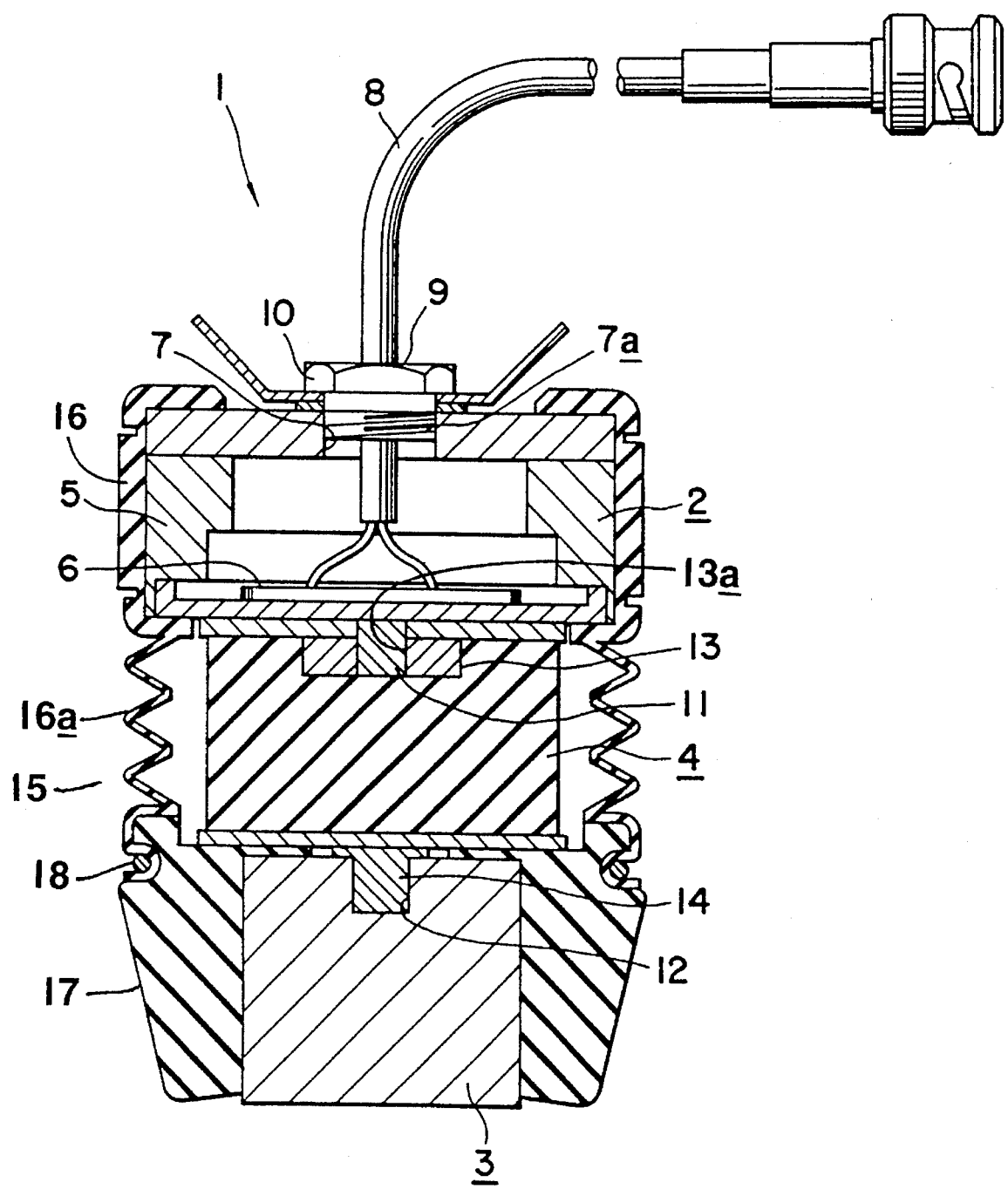
FIG. 1 is a longitudinal sectional view of a leakage sound detecting apparatus according to the present invention.

A leakage-sound detecting apparatus according to the present invention has a detection portion 2 and a pedestal portion 3, which are connected by a mechanical resonant member 4, as shown in FIG. 1.

The detection portion 2 is constructed such that a piezoelectric element 6 is encased in a casing 5 made of metal such as brass, stainless steel and the like.

The casing 5 is bored at the upper wall portion with a cord draw-out hole 7 so that an output cord 8 of the piezoelectric element 6 fixedly mounted on the upper surface of the lower wall portion is drawn out of the cord draw-out hole 7.

The cord draw-out hole 7 is incised with an internal thread portion 7a, and a stop bolt 10 bored with a through-hole 9 is threadedly fitted into the cord draw-out hole 7 to close the cord draw-out hole 7.

A connection bolt 11 is fixedly mounted on the lower surface of the lower wall portion of the casing 5.

The pedestal portion 3 has a cylindrical lumpy configuration made of a rigid material.

The rigid materials may include metallic materials such as brass, stainless steel and the like, or a magnetic material for securing to a metal fire hydrant or the like by a magnetic force.

Further, a bolt hole 12 is secured to the upper surface portion of the pedestal portion 3.

The mechanical resonant member 4 has a cylindrical lumpy configuration made of a soft material.

The soft materials used include rubber, foamed rubber, foamed plastics, etc., particularly preferably, rubber materials such as urethane rubber, neoprene rubber, etc. having a hardness of from 10 to 50 Hs.

Further, a metallic insert member 13 incised with internal threads 13a is embedded in the upper surface portion of the mechanical resonant member 4, and a connection bolt 14 is secured to the lower surface thereof.

The connection bolt 11 of the detection portion 2 is threadedly engaged with the insert member 13 of the mechanical resonant member 4 and the connection bolt 14 of the mechanical resonant member 4 are threadedly engaged with the bolt hole 12 of the pedestal portion 3 whereby the detection portion 2, the pedestal portion 3 and the mechanical resonant member 4 can be connected together.

A coating member 15 is mounted over the detection portion 2, the mechanical resonant member 4 and the pedestal portion 3.

The coating member 15 is composed of an upper coating member 16 of which lower half portion comprises a bellows-like portion 16a and a lower coating member 17, which are formed of soft materials such as rubber, foamed rubber, foamed plastics and the like. Rubber materials such as urethane rubber, neoprene rubber and the like having a hardness of from 10 to 50 Hs are particularly preferred.

The lower portion of the upper coating member 16 is fitted into the upper portion of the lower coating member 17, and the resultant fitting portion is pressed by an annular member 18 to thereby connect the upper coating member 16 to the lower coating member 17.

The operation of the leakage-sound detecting apparatus 1 as well as the method of use thereof will be described hereinafter.

The leakage-sound detecting apparatus 1 is placed on the ground surface in which a water service pipeline A is embedded or secured to a fire hydrant B or the like installed at a predetermined position of the water service pipeline A for use.

The leakage-sound detecting apparatus 1 captures sounds of various frequency components in the pedestal portion 3, and further amplifies low frequency components in the vicinity of a set value in the mechanical resonant member 4 and substantially attenuates high frequency components other than the low frequency components and thereafter converts the sounds of low frequency components remaining in the detection portion 2 into an electric signal and output it.

Further, the coating member 15 is mounted over the detection portion 2, the mechanical resonant member 4 and the pedestal portion 3 to more efficiently minimize the detection of foreign noises.

The amplification and attenuation operations of the leakage-sound detecting apparatus 1 will be described giving specific experimental examples while being compared with the operation of the conventional leakage-sound detecting apparatus.

(Experimental Example 1)

A vinyl chloride pipe having a diameter of 75 mm is bored with a small hole to falsely generate a water leakage sound. Water leakage sounds at a water leakage point and a point 10 m away from the water leakage point were detected.

Figure 2A:
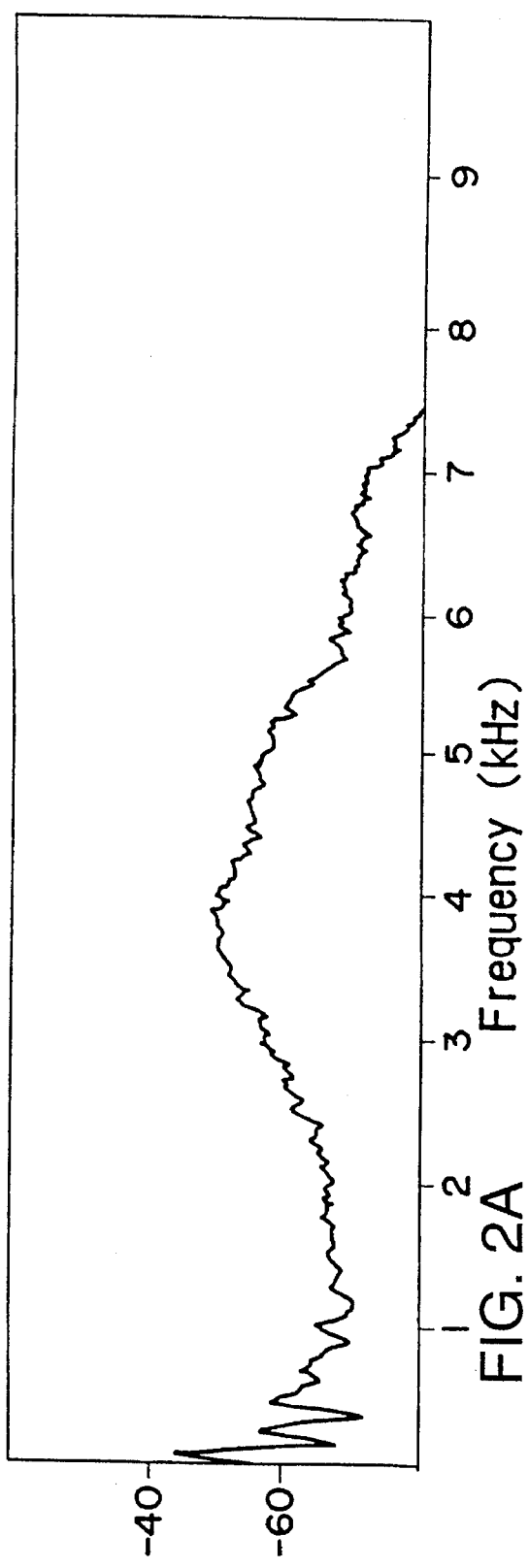
FIGS. 2(A) and 2(B) are spectrum diagrams of a water leakage sound in plastic pipes, FIG. 2(A) being at a water leakage point and FIG. 2(B) being at a point 10 m away from the water leakage point.
Figure 2B:
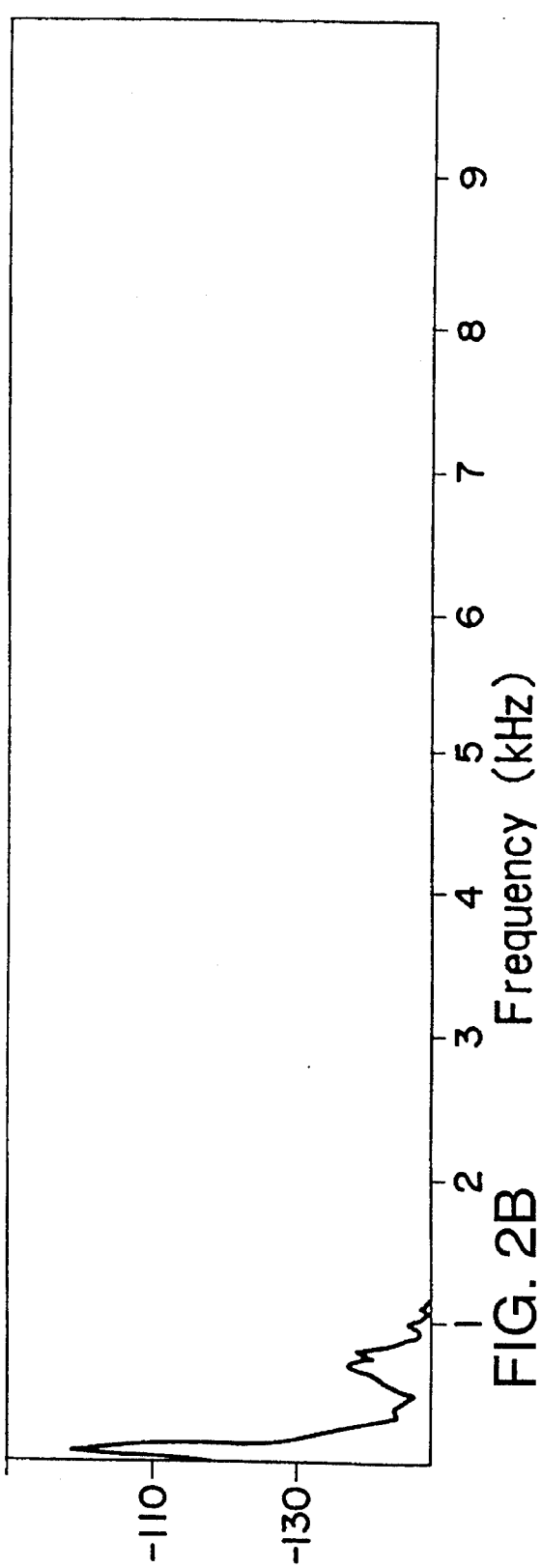

Experimental results are as shown in FIGS. 2(A) and 2(B).

It is understood from FIG. 2(A) that at the water leakage point, sounds having a wide band of frequencies from low frequency components of scores of Hz to high frequency components of several kHz are generated.

On the other hand, it is understood from FIG. 2(B) that at the point 10 m away from the water leakage point, no high frequency component in excess of 1 kHz exists and low frequency components in the vicinity of 500 Hz are also substantially attenuated.

(Experimental Example 2)

Figure 3:
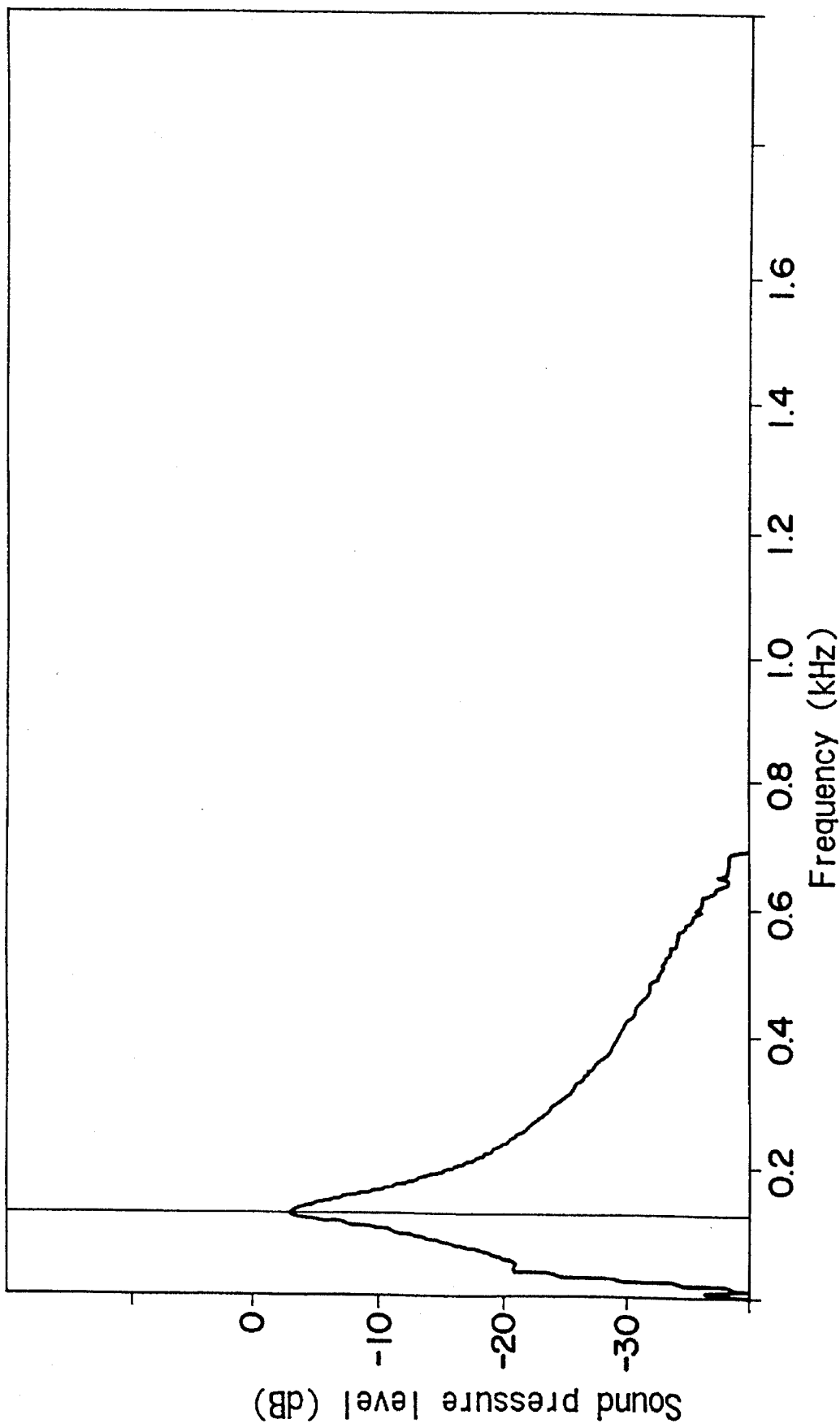
FIG. 3 is a frequency characteristic view of the leakage-sound detecting apparatus according to the present invention.

The leakage-sound detecting apparatus 1 having the mechanical resonant member 4 made of urethane rubber, having a resonance frequency of from 100 to 200 Hz set as shown in FIG. 3, and having no sensitivity in a high frequency component in excess of 700 Hz was used. The false water leakage sound in the Experimental Example 1 was generated to detect a water leakage propagation sound at a point 10 m away from the water leakage point.

Figure 4:
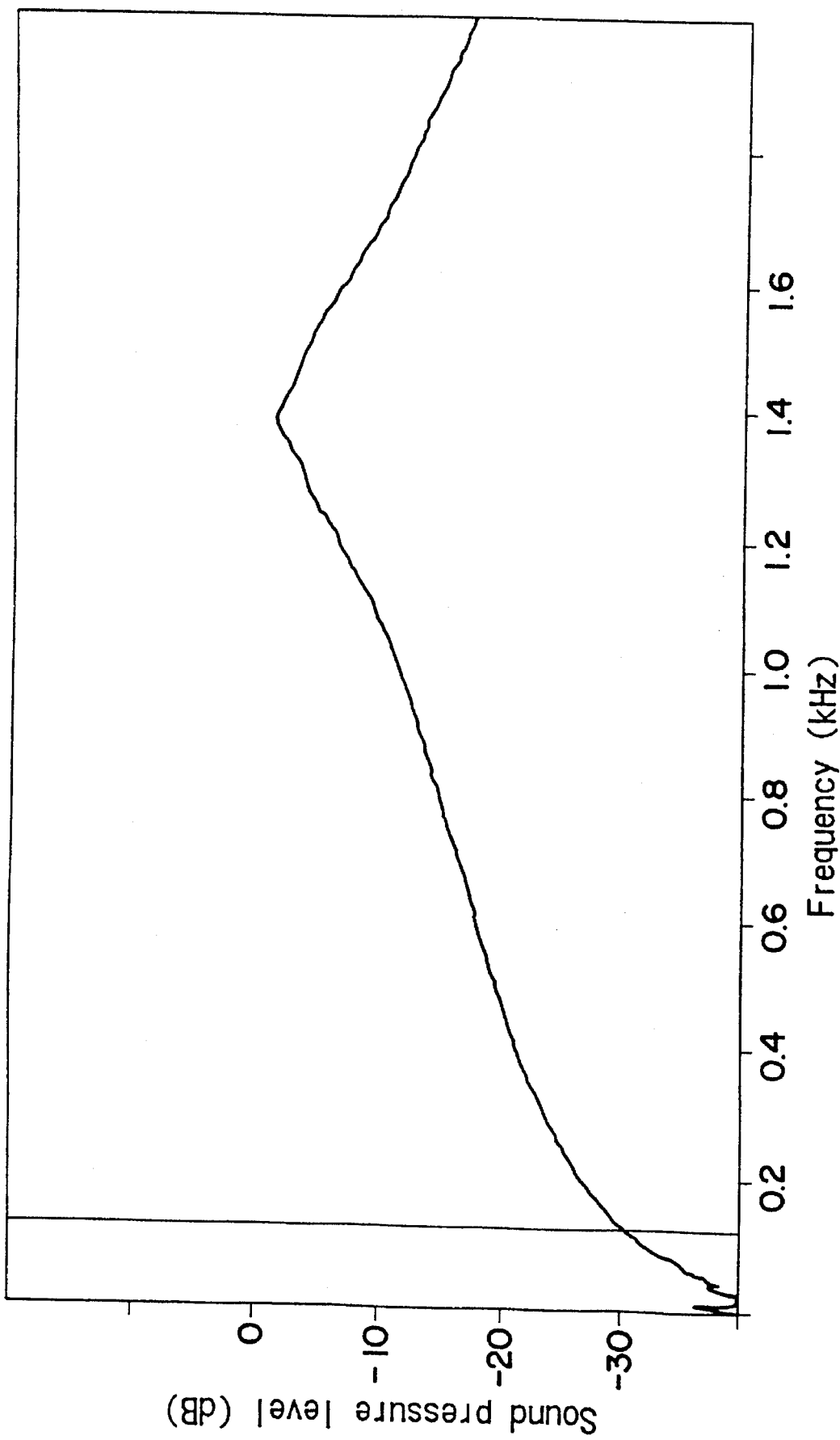
FIG. 4 is a frequency characteristic view of a conventional leakage-sound detecting apparatus.

Also, a conventional leakage-sound detecting apparatus having a sensitivity characteristic as shown in FIG. 4 was used. A water leakage propagation sound at the point 10 m away from the water leakage point was detected under the similar conditions.

Experimental results are as shown in FIGS. 5(A) and 5(B).

It is understood from FIG. 5(A) that in the leakage-sound detecting apparatus 1 according to the present invention, the spectrum waveform is wholly high in sensitivity, and particularly, a sound pressure level is sufficiently secured between 100 and 200 Hz whereas the high frequency component is rarely present.

It is understood from FIG. 5(B) that in the conventional leakage-sound detecting apparatus, the spectrum waveform is wholly low in sensitivity, and particularly, the low frequency component between 100 and 200 Hz is not present whereas the high frequency components are variously present.

It has been found from the foregoing that according to the leakage-sound detecting apparatus 1 of the present invention, in the mechanical resonant member 4, the low frequency component between 100 and 200 Hz is amplified, the foreign noises comprised of high frequency components in excess of 700 Hz and vibration sounds coming from afar comprised of low frequency components less than 50 Hz or the like are substantially attenuated, and therefore the water leakage propagation sound in the plastic pipe can be efficiently detected.

Next, the actual detection of water leakage by the leakage-sound detecting apparatus 1 according to the present invention will be described while being compared to that by use of the conventional leakage-sound detecting apparatus.

(Experimental Example 3)

Figure 6:
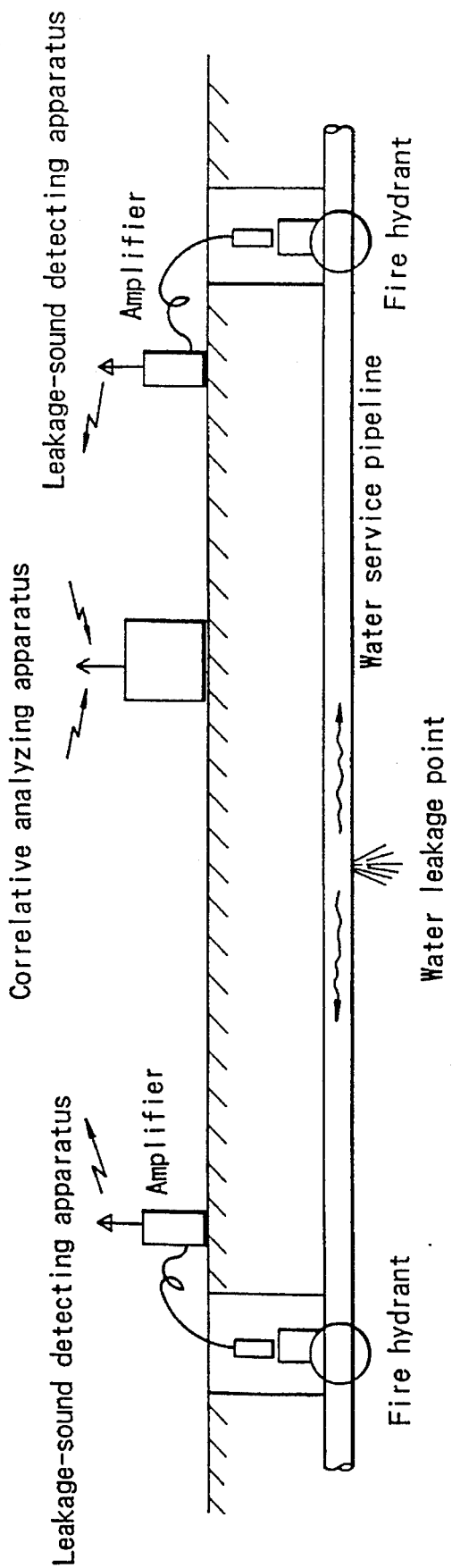
FIG. 6 is a view showing a water leakage detecting method by a correlation type water leakage detecting apparatus.

As shown in FIG. 6, a correlative type water leakage detecting apparatus was constituted by two leakage-sound detecting apparatuses according to the present invention and a correlative analyzing apparatus. Two fire hydrants are installed at spots at fixed intervals from a water leakage point, and the leakage-sound detecting apparatus is secured to each of the fire hydrants. Water leakage propagation sounds at the two points were detected and then transmitted by wireless to the correlative analyzing apparatus, by which correlative waveforms were displayed.

Further, the conventional leakage-sound detecting apparatus was used to detect the water leakage propagation sounds at the two points under the similar conditions. The correlative waveforms were displayed by the correlative analyzing apparatus.

Figure 7A:
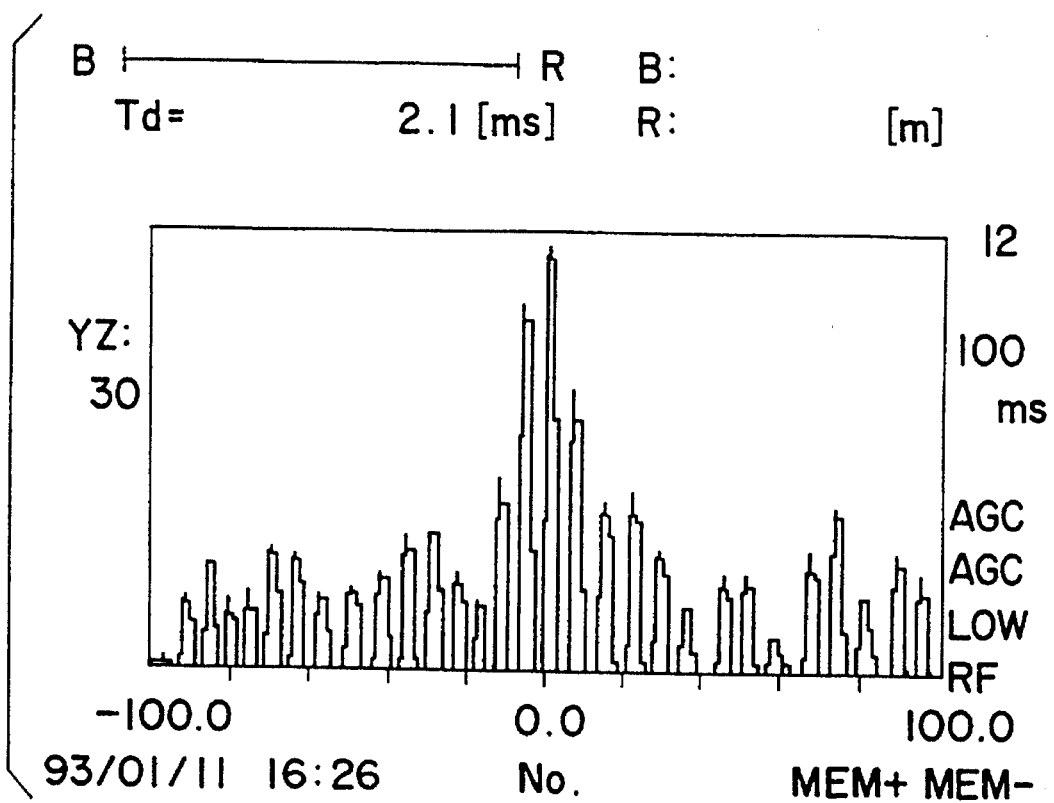
FIGS. 7(A) and 7(B) are correlative waveforms by the correlation type water leakage detecting apparatus, FIG. 7(A) showing the detection by the leakage-sound detecting apparatus according to the present invention, FIG. 7(B) showing the detection by the conventional leakage sound detecting apparatus.
Figure 7B:
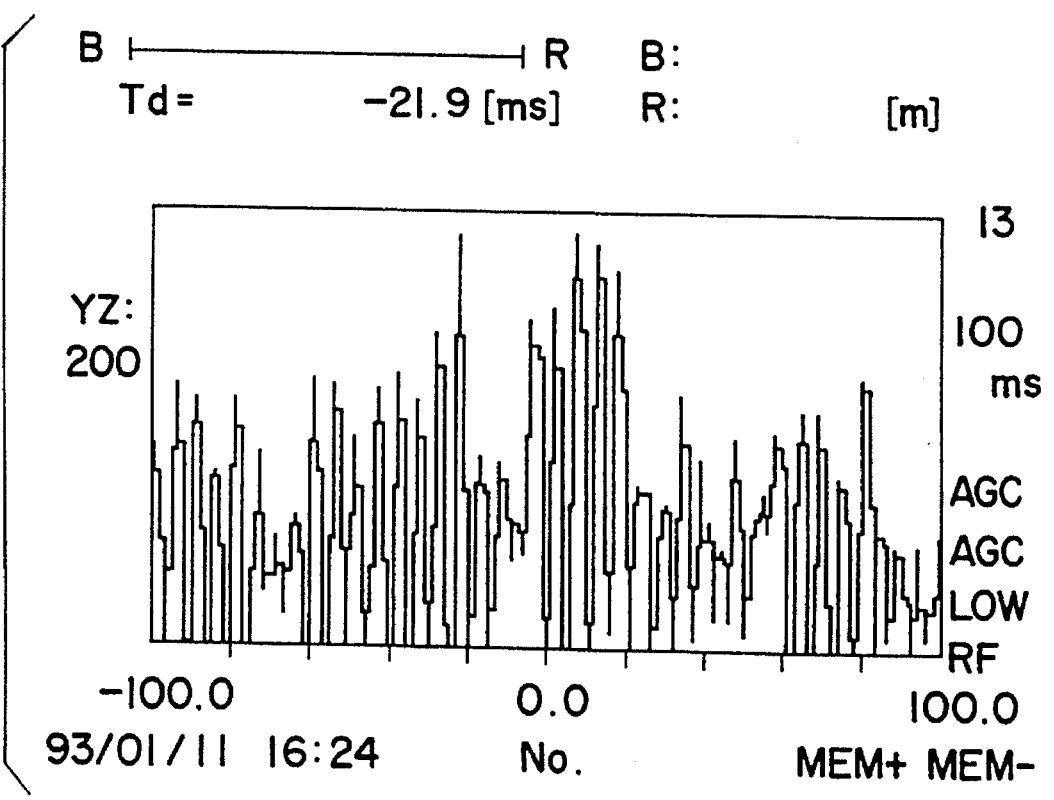

Experimental results are as shown in FIGS. 7(A) and 7(B).

As shown in FIG. 7(A), in the case where the leakage-sound detecting apparatus 1 according to the present invention was used, a peak value in the correlative wave-form clearly appears. Therefore, delay time Td can be analyzed to be 2.1. The water leakage point could be detected accurately.

As shown in FIG. 7(B), in the case where the conventional leakage-sound detecting apparatus was used, a plurality of peak values in the correlative waveform appear. Therefore, delay time Td is erroneously analyzed to be −21.9. The water leakage point could not be detected accurately.

The spectrum of the water leakage propagation sound is also somewhat changed due to the material, shape and the like of the plastic pipes. However, this can be corrected by suitably changing the material, height and the like of the mechanical resonant member 4 to change the set resonant frequency.

Further, since the soft material such as rubber and the like is used as the material for the mechanical resonant member 4, there is a secondary effect such that even if the leakage-sound detecting apparatus 1 is erroneously fallen, the mechanical resonant member 4 absorbs the shock force to prevent the piezoelectric element from being broken.

Figure 8:
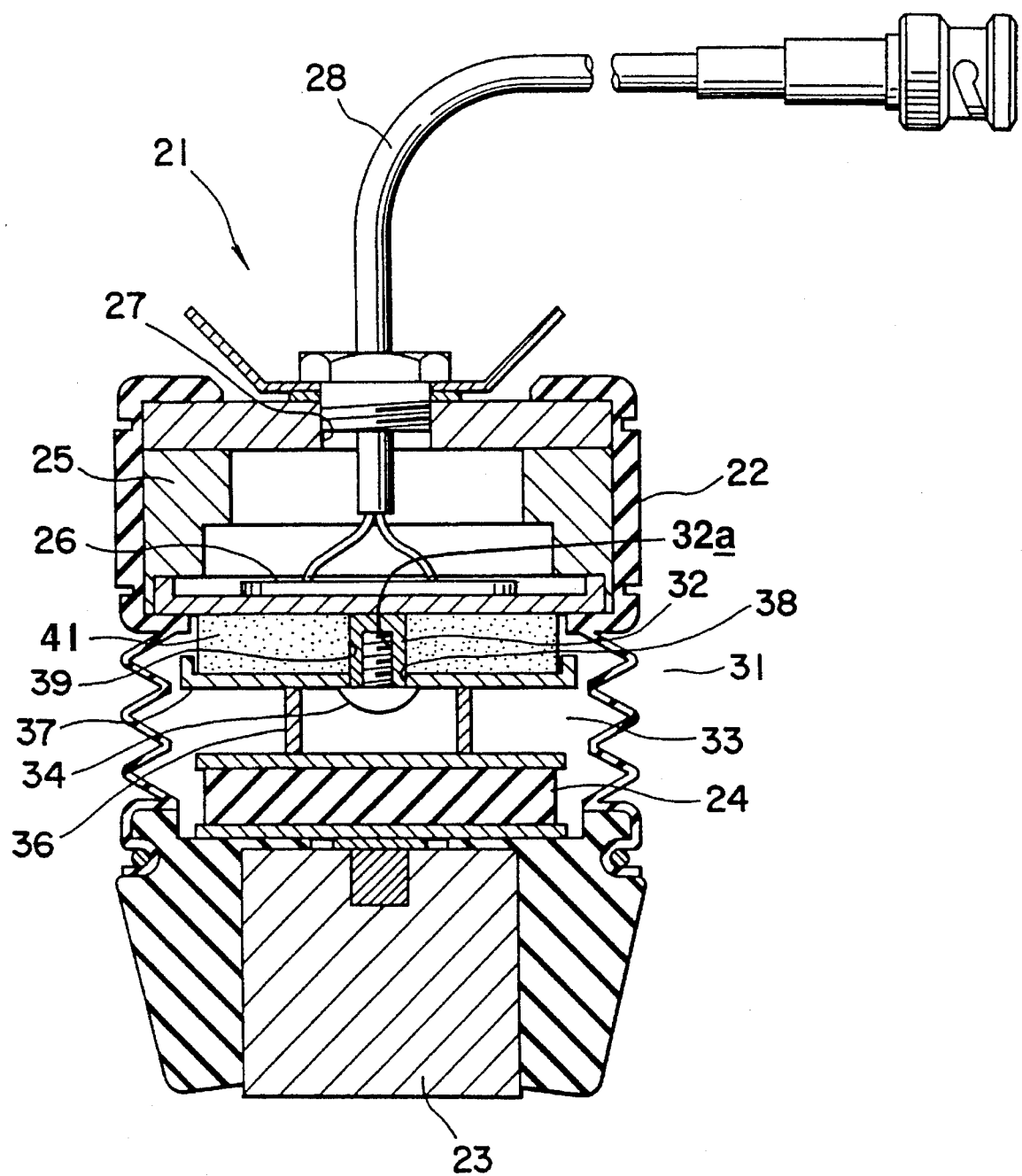
FIG. 8 is a longitudinal sectional view of another embodiment of the leakage-sound detecting apparatus.

A leakage-sound detecting apparatus 21 shown in FIG. 8 is constructed such that a detection portion 22 and a pedestal portion 23 are connected by a mechanical resonant member 24, and a buffer portion 31 is formed between the detection portion 22 and the mechanical resonant member 24.

The buffer portion 31 comprises a lower extending portion 32 provided on the lower wall portion of a casing 25 of the detection portion 22, a buffer-member supporting portion 33 provided on the upper surface portion of the mechanical resonant member 24, a stop screw 34 and a buffer member 41.

The lower extending portion 32 has a small-diameter circular rod configuration, and is incised with internal threads 32a.

The buffer-member supporting portion 33 is constructed such that a disk-like portion 37 is secured to the upper end of a cylindrical portion 36, the disk-like portion 37 being bored with an insert hole 38.

The buffer member 41 is a cylindrical lumpy member formed of foamed materials such as foamed urethane rubber, foamed neoprene rubber, etc., and is formed at the central portion thereof with a through-hole 39.

Figure 9A:
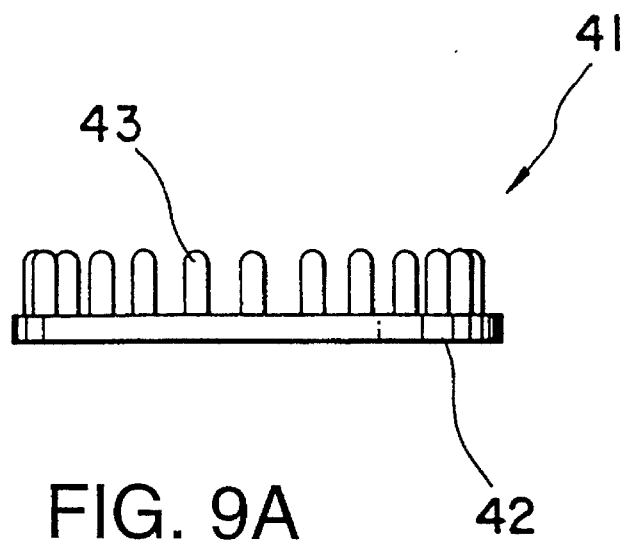
FIGS. 9(A) and 9(B) show another embodiment of a buffer member, FIG. 9(A) being a front view, FIG. 9(B) being a plan view.
Figure 9B:
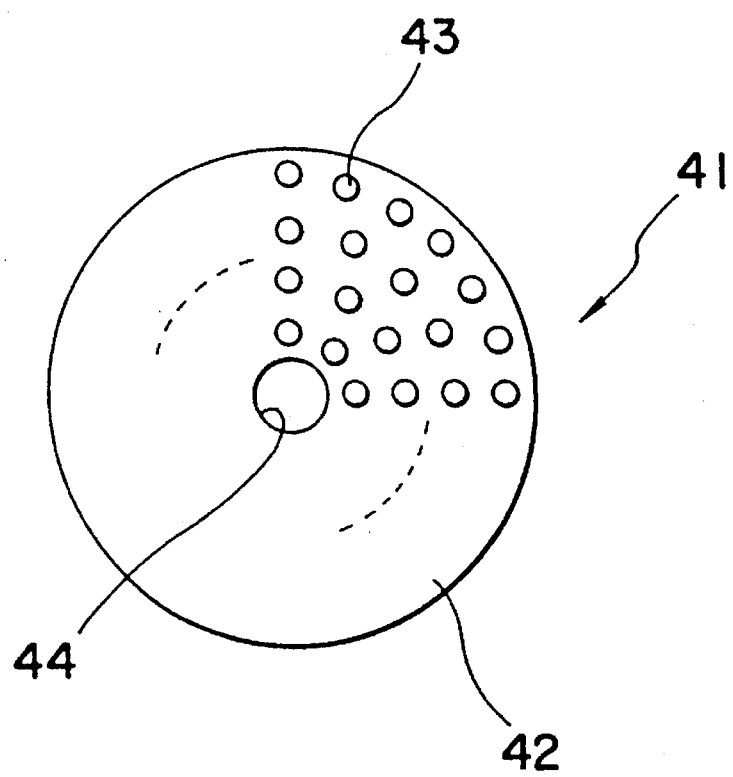

An alternative embodiment of buffer member 41 is shown in FIG. 9. In this embodiment, buffer member 41 is made of a member formed of rubber materials such as urethane rubber, neoprene rubber, etc. having a hardness of from 20 to 40 Hs and has a number of protrusions 43 provided upright on a thin-wall plate-like portion 42, as shown in FIG. 9. In this case, the thin-wall plate-like portion 42 is formed at the central portion thereof with an insert hole 44.

The buffer member 41 is arranged between the lower wall portion of the casing 25 of the detection portion 22 and the buffer-member supporting portion 33, the lower extending portion 32 is inserted into the through-hole 39 of the buffer member 35, the lower end of the lower extending portion 32 is located at the insert hole 38 of the disk-like portion 37 of the buffer-member supporting portion 33, and the lower extending portion 32 and the disk-like portion 37 of the buffer-member supporting portion 33 are connected by the stop screw 34 from the bottom to thereby form the buffer portion 31.

The leakage-sound detecting apparatus 21 is constructed as described above, and is operated as follows.

In the case where the overload is applied from the bottom of the pedestal portion 23 as a result of falling of the leakage-sound detecting apparatus 21 or the like, the pedestal portion 23, the mechanical resonant member 24 and the buffer-member supporting portion 33 are subjected to the intense shock force and integrally move upward since the pedestal portion 23, the mechanical resonant member 24 and the buffer-member supporting portion 33 are integrated.

However, the lower extending portion 32 and the buffer-member supporting portion 33 are merely connected by the stop screw 34 but are not completely integrated, the lower extending portion 32 is not moved upward together with the buffer-member supporting portion 33 but only the buffer-member supporting portion 33 moves upward to compress the buffer member 41.

Accordingly, the shock force is minimized by the buffer member 41 so that no overload is applied to the detection portion 22, and therefore the piezoelectric element 26 is not curved or broken.

On the other hand, since in the normal detection, the water leakage propagation sound captured by the peddestal portion 23 is transmitted to the lower extending portion 32 and the detection portion 22 through the mechanical resonant member 24, the buffer-member supporting portion 33 and the stop screw 34, the amplification action and attenuation action are not lowered.

The leakage-sound detecting apparatus according to the present invention is constructed such that the detection portion and the pedestal portion are connected through the mechanical resonant member made of a soft material the presence of the mechanical resonant member can increase the sensitivity in the low frequency component and can efficiently reduce the detection of the foreign noises. Therefore, the detection of water leakage in the plastic pipe can be substantially efficiently performed.

Further, if as the soft material for the mechanical resonant member, rubber materials such as urethane rubber and neoprene rubber having a hardness of from 10 to 50 Hs are used, the amplification action and attenuation action can be effectively exhibited, which is more suitable.

Furthermore, the lower extending portion and the buffer-member supporting portion are connected by the stop screw and the buffer member is arranged between the lower wall portion of the casing and the buffer-member supporting portion to form the buffer portion. Therefore, shock force is minimized by the buffer member, and no load is applied to the detection portion. The piezoelectric element is not curved or broken.

On the other hand, in the normal detection, the water leakage propagation sound is transmitted to the lower extending portion and the detection portion through the pedestal portion, the mechanical resonant member, the buffer-member supporting portion and the stop screw, and therefore the amplification action and attenuation action are not lowered.

We claim:

1. A leakage-sound detecting apparatus in which a detection portion having a piezoelectric element encased in a casing and a pedestal portion made of a rigid material are connected through a mechanical resonant member made of a soft material, wherein a lower extending portion incised with internal threads is provided on the lower wall portion of a casing of the detection portion, a buffer-member supporting portion bored with an insert hole is provided on the upper surface portion of the mechanical resonant member, the lower end of the lower extending portion is located at the insert hole, the lower extending portion and the buffer-member supporting portion are connected by a stop screw, and a buffer member is arranged between the lower wall portion of the casing and the buffer-member supporting portion to form a buffer portion.

2. A leakage-sound detecting apparatus according to claim 1 wherein said buffer member comprises a lumpy member formed of a foamed rubber material.

3. A leakage-sound detecting apparatus according to claim 1 wherein said buffer member comprises a member formed of a rubber material having a hardness of from 20 to 40 Hs and having a number of protrusions stood upright on a thin-wall plate-like portion.

4. A leakage-sound detecting apparatus in which a detection portion having a piezoelectric element encased in a casing and a pedestal portion made of a rigid material are connected through a mechanical resonant member made of a rubber material such as urethane rubber and neoprene rubber having a hardness of from 10 to 50 Hs, wherein a lower extending portion incised with internal threads is provided on the lower wall portion of a casing of the detection portion, a buffer-member supporting portion bored with an insert hole is provided on the upper surface portion of the mechanical resonant member, the lower end of the lower extending portion is located at the insert hole, the lower extending portion and the buffer-member supporting portion are connected by a stop screw, and a buffer member is arranged between the lower wall portion of the casing and the buffer-member supporting portion to form a buffer portion.

5. A leakage-sound detecting apparatus according to claim 4 wherein said buffer member comprises a lumpy member formed of a foamed rubber material.

6. A leakage-sound detecting apparatus according to claim 4 wherein said buffer member comprises a member formed of a rubber material having a hardness of from 20 to 40 Hs and having a number of protrusions stood upright on a thin-wall plate-like portion.

* * * * *